Nov. 22, 1927.  
E. GUSTAFSON  
1,650,125  
SPEEDOMETER TRANSMISSION DRIVE  
Filed Jan. 6, 1926

Inventor  
Edwin Gustafson  
By Blackmore, Spencer & Flint  
Attorneys

Patented Nov. 22, 1927.

1,650,125

UNITED STATES PATENT OFFICE.

EDWIN GUSTAFSON, OF FLINT, MICHIGAN, ASSIGNOR TO A. C. SPARK PLUG COMPANY, OF FLINT, MICHIGAN, A COMPANY OF MICHIGAN.

SPEEDOMETER TRANSMISSION DRIVE.

Application filed January 6, 1926. Serial No. 79,556.

This invention is in the nature of a power take off. It is intended more particularly to take off power from a driven shaft of a motor vehicle to operate the speedometer.

In devices of this kind it is desirable that the construction be made as simple as possible and such simplification is a primary object of this invention. To that end the invention is characterized by the omission of bearings and bushings for the driven shaft, that shaft being mounted directly in plain bearings within the gear casing. A further object is to provide a very simple and effective means for securing the speedometer driving shaft within the gear casing and connecting thereto the usual flexible driving shaft.

Figure 1:
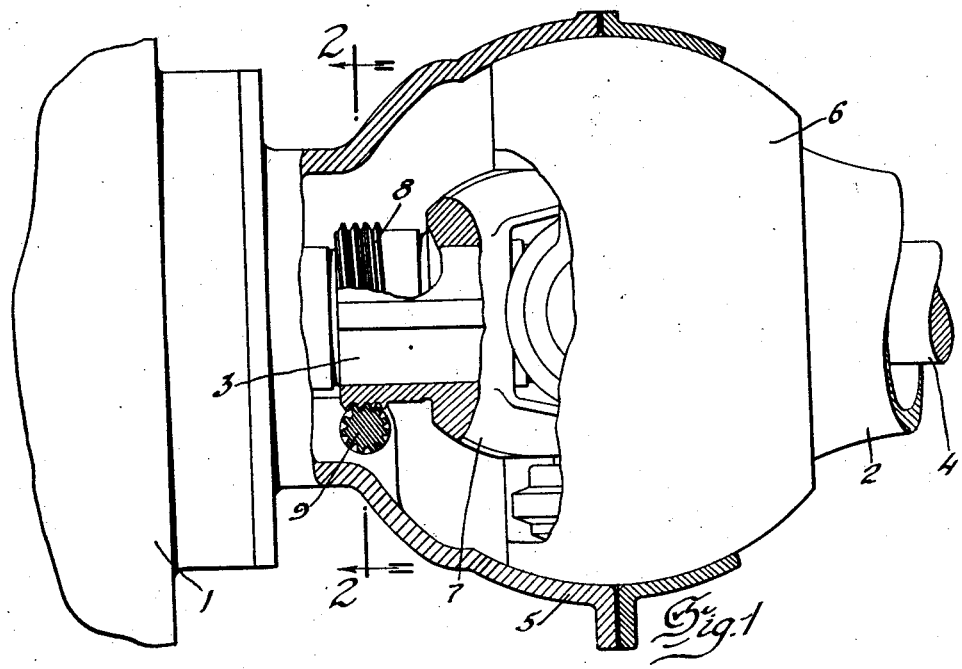
Figure 2:
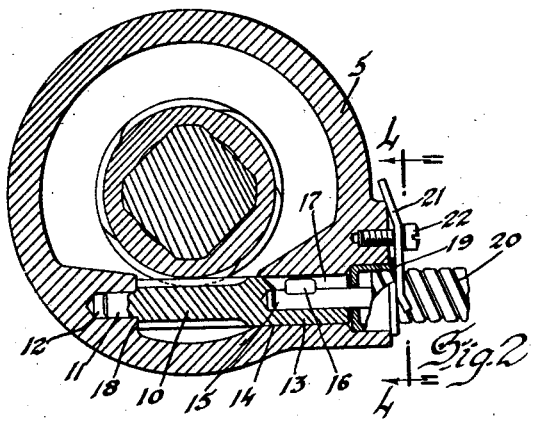
Figure 3:
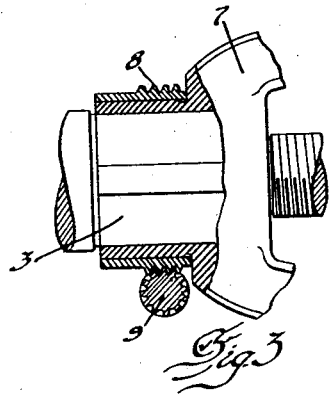
Figure 4:
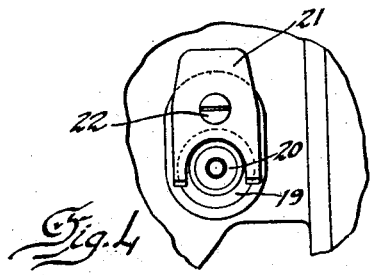

The accomplishment of these and other objects is attained by the structure herein described and shown in the accompanying drawing. In the drawing, Figure 1 is a side elevation of a universal joint casing of a motor vehicle, parts broken away and parts in section. Figure 2 is a vertical section on line 2—2 of Figure 1. Figure 3 is a sectional detail of modified form. Figure 4 shows in elevation a detail of the fastening means.

Referring to the drawing, numeral 1 represents the transmission housing and numeral 2 is the housing for the propeller shaft. The transmission shaft is represented by numeral 3 and the propeller shaft by numeral 4. The housing members 1 and 2 are coupled by a universal joint comprising spherical members 5 connected to the housing 1 and 6 connected to the housing 2. Figure 1 shows the universal joint connecting the transmission shaft and the propeller shaft the forward member of this universal joint being designated by numeral 7. This forward member 7 is secured to the squared portion of shaft 3 as will be seen by examination of Figure 1. The sleeve portion of this universal joint member 7 has a worm provided thereon as at 8. This worm is the driving means from which power is taken to drive the speedometer mechanism. The worm gear driven by the worm 8 is represented by numeral 9. It is the mounting of this worm gear 9 which is an essential part of this invention.

The worm gear 9 is provided with an intermediate worm gear portion 10, the spindle of which extends axially from both ends of the worm portion. At one end of the worm portion 10 the spindle is reduced in diameter as at 11 and is received within an opening 12 therefor cut into the wall of the housing 5. At the other end of the portion 10 is spindle 13, of the same diameter as the worm gear portion 10, and it is received in an opening 14 cut through the wall of housing 5 in alignment with the opening 12 previously referred to. This spindle portion is centrally bored to receive the end 15 of the flexible speedometer driving shaft. Its key 16 is received in a slot 17 provided in the spindle portion 13. It will also be observed from examination of Figure 2 that the worm gear shaft is held in its inward position by the abutment of the shoulder 18 between the worm gear portion and the reduced spindle with the inner wall of the housing. In the opposite end the opening 14 is provided with a counter bored portion and received within the same is a flanged cup member 19. This flanged cup member is secured to the end of the flexible casing 20 of the flexible drive shaft, its flange rests upon the outer face of the housing, and the bottom of the cup engages the end of the spindle member 13. By means of the abutment 18 and the engagement of the spindle 13 with the bottom of the cup 19 the driven worm gear is held in position. For securing the cup 19 there is employed a small forked stamping 21. This stamping is held against the wall of the housing by machine screw 22 and its forked portion engages the flange of the cup 19 as best shown in Figure 4.

In Figure 3 is shown a modification, according to which the driving worm, instead of being made on the sleeve of the universal joint member 7, is made on a separate sleeve secured to the universal joint member. In other respects this modification is the same as that shown in the other figures.

It will be noted that by the construction described a very simple arrangement for driving the speedometer shaft is arranged. The use of bearings and bushings for the driven worm gear is entirely avoided and the fastening means for holding the parts in position will be seen to be very simple, easy of manufacture and very simple to apply.

I claim:

1. An instrument drive power take off comprising a casing having a tubular opening through the wall, a tubular bearing within the casing in alignment with the first opening, a shaft having an intermediate gear and end bearing portions journaled directly in the opening and bearing, the end bearing portion within the opening having provision for engaging a flexible drive shaft, a collar engaging the end of the shaft, secured to the flexible shaft housing and having a flange engaging the casing wall, means secured to the casing and holding the collar in position.

2. Means for connecting a flexible shaft to an inclosed driving gear comprising a flanged collar secured to the casing of the flexible shaft, its flange engaging the wall of the gear casing, a forked plate secured to the gear casing and engaging the flange of the collar, the drive shaft extending within the gear casing and engaging the shaft of the driving gear within the casing.

3. In combination with a casing, a gear element therein, an external flexible shaft and a flexible housing therefor, means to connect said flexible shaft to the enclosed gear element comprising a flanged collar secured to the flexible housing of the flexible shaft, its flange engaging the wall of the casing for the gear element, a forked plate secured to the gear casing and engaging the flange of the collar, the end of the flexible shaft extending into the gear casing and engaging the gear element therein for driving engagement therewith.

In testimony whereof I affix my signature.

EDWIN GUSTAFSON.